US010868483B1

United States Patent
LeGros et al.

(10) Patent No.: US 10,868,483 B1
(45) Date of Patent: Dec. 15, 2020

(54) DC GENERATOR SYSTEM

(71) Applicant: Hamilton Sundstrand Corporation, Charlotte, NC (US)

(72) Inventors: Craig R. LeGros, Rockford, IL (US); Tom A. Utecht, Cherry Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/429,953

(22) Filed: Jun. 3, 2019

(51) Int. Cl.
*H02P 9/10* (2006.01)
*H02P 9/30* (2006.01)
*B64D 31/00* (2006.01)
H02P 101/25 (2016.01)
H02P 101/30 (2015.01)

(52) U.S. Cl.
CPC ............ *H02P 9/102* (2013.01); *B64D 31/00* (2013.01); *H02P 9/307* (2013.01); *B64D 2221/00* (2013.01); *H02P 2101/25* (2015.01); *H02P 2101/30* (2015.01)

(58) Field of Classification Search
CPC .......... H02P 9/102; H02P 9/307; B64D 31/00
See application file for complete search history.

(56) References Cited

U.S. PATENT DOCUMENTS

| | | | | |
|---|---|---|---|---|
| 7,405,542 B1* | 7/2008 | McAvoy | ................. | H02P 5/747 322/14 |
| 10,208,675 B2* | 2/2019 | Mackin | ...................... | F02C 7/36 |
| 10,429,154 B2* | 10/2019 | Munevar | ................. | F01D 19/00 |
| 2009/0224599 A1* | 9/2009 | Yue | .......................... | H02J 1/10 307/9.1 |
| 2010/0039075 A1* | 2/2010 | Trainer | ..................... | H02P 9/04 322/58 |
| 2010/0207396 A1* | 8/2010 | Simon | ....................... | H02P 9/06 290/55 |
| 2012/0327693 A1* | 12/2012 | Cousineau | ................ | H02P 9/48 363/35 |

(Continued)

FOREIGN PATENT DOCUMENTS

| EP | 2636873 A2 | 9/2013 |
|---|---|---|
| WO | 2016/195936 A1 | 12/2016 |

OTHER PUBLICATIONS

Extended European search report issued in corresponding EP application No. 192126753, dated Jul. 9, 2020.

*Primary Examiner* — Viet P Nguyen
(74) *Attorney, Agent, or Firm* — Locke Lord LLP; Scott D. Wofsy; Georgi Korobanov

(57) ABSTRACT

A system including a variable frequency generator (VFG) including a generator configured to conduct alternating current to a first rectifier configured to convert alternating current from the VFG to direct current and drive it to an HVDC Bus Network, a variable frequency second generator including a second generator configured to conduct alternating current to a second rectifier configured to convert alternating current from the second generator to direct current and conduct it to the HVDC Bus Network, a speed correcting gearbox operatively connected to the VFG configured to align generator frequency to the second generator frequency, and a VFG control unit operatively connected to the generator configured to control the VFG, and a second generator control unit operatively connected to the second generator and the HVDC Bus Network configured to control the second generator.

11 Claims, 1 Drawing Sheet

(56) References Cited

U.S. PATENT DOCUMENTS

| | | |
|---|---|---|
| 2013/0023294 A1 | 1/2013 | Singh |
| 2013/0088019 A1* | 4/2013 | Huang .................... B60R 16/03 |
| | | 290/1 C |
| 2014/0167516 A1 | 6/2014 | Gataric et al. |
| 2016/0218650 A1* | 7/2016 | Gajanayake ............ F01D 15/10 |
| 2017/0009745 A1* | 1/2017 | Brogan .................. F03D 9/257 |
| 2018/0112599 A1* | 4/2018 | Dalal ...................... B64D 33/00 |
| 2018/0219502 A1* | 8/2018 | Alecu ....................... H02J 1/06 |
| 2019/0214828 A1* | 7/2019 | Gao ..................... G01R 31/008 |

* cited by examiner

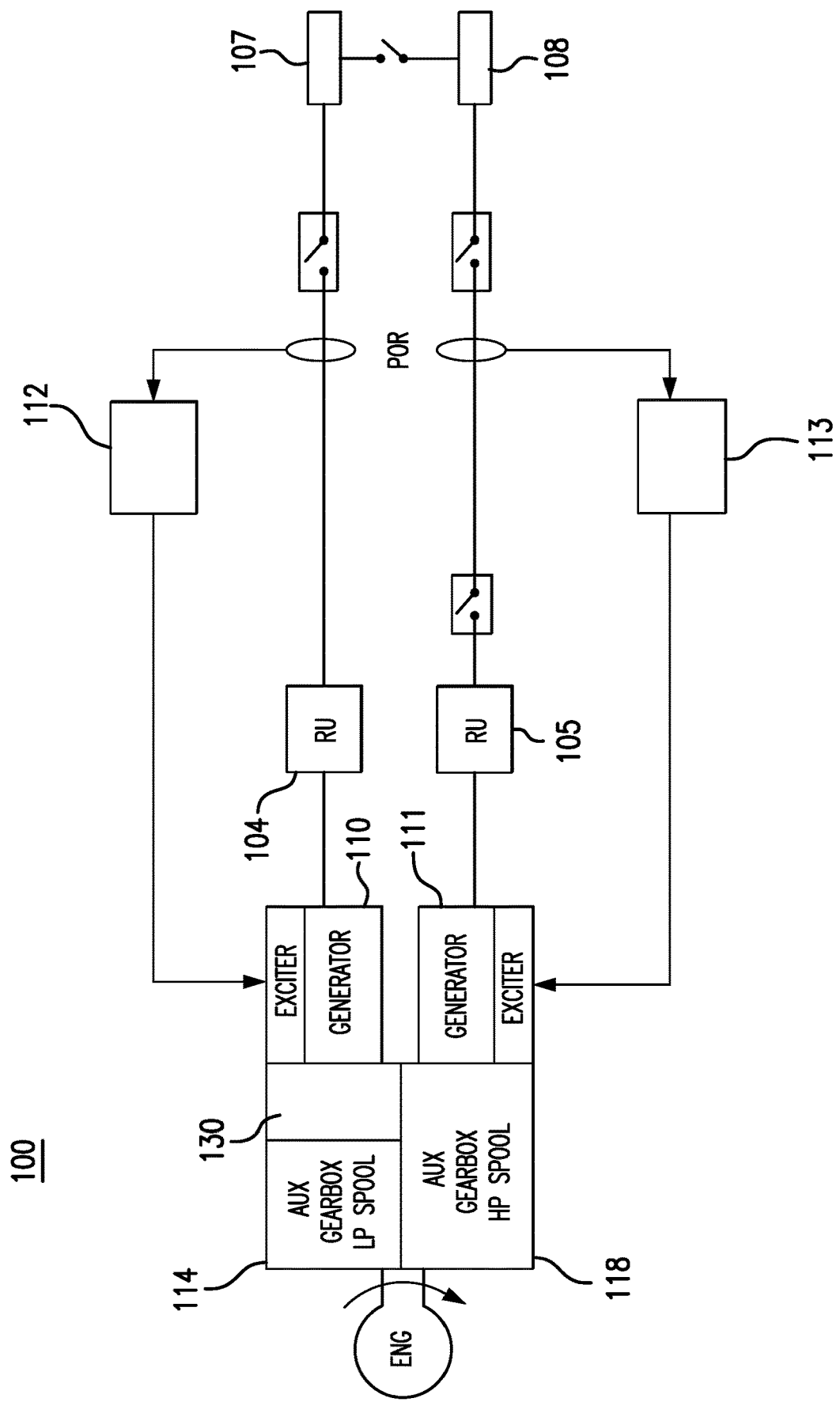

DC GENERATOR SYSTEM

BACKGROUND

Technological Field

The present disclosure relates to managing electrical system, and more particularly to reducing torque ripple in electrical power generation systems.

Description of Related Art

In High Voltage DC, such as 540 volts, parallel applications, DC voltage ripple on the bus produces unacceptable system performance parameters, such as reduced LRU efficiencies, torque ripple, load ripple and contactor control issues, and reduced overall system reliability.

Conventional methods and systems have generally been considered unsatisfactory for their intended purpose of controlling and reducing torque ripple in the aforementioned systems. There is a need in the art for electrical management systems having reduced torque ripple and reduced load ripple. There also remains a need in the art for such systems that are economically viable. The present disclosure may provide a solution for at least one of these remaining challenges.

SUMMARY OF THE INVENTION

A system configured to control power transfer of an aircraft engine includes a variable frequency generator (VFG) including a generator configured to direct alternating current to a first rectifier configured to convert alternating current from the VFG to direct current and drive it to a High Voltage DC (HVDC) Bus Network and a second variable frequency generator configured to direct alternating current to a second rectifier configured to convert alternating current from the second generator to direct current and direct it to the HVDC Bus Network, a speed correcting gearbox operatively connected to the VFG configured to align generator frequency to the second generator frequency, a VFG control unit operatively connected to the generator and to the electric module configured to control the VFG, and a second generator control unit operatively connected to the second generator and the HVDC Bus Network configured to control the second generator.

The first VFG can be operatively connected to a low-pressure spool gearbox spool configured to control an engine of an aircraft and the speed-correcting gearbox can be located between the VFG and the low pressure gearbox. The second generator can be operatively connected to a high-pressure gearbox spool configured to control the engine of the aircraft. The output of the first rectifier can be 540 volts and the output of the second rectifier can be 540 volts.

The HVDC Bus Network includes a pair of independent DC busses configured to distribute power.

A method includes driving alternating current from a first generator connected to a low pressure gearbox spool, driving alternating current from a second generator connected to a high pressure gearbox spool, and aligning a frequency output of the first generator to a frequency output of the second generator in order to control performance parameters of a direct current system of an aircraft, comprising reducing voltage ripple and reducing load ripple.

The first generator (VFG) can direct 540 volts to a first rectifier and the second generator can direct 540 volts to a second rectifier. These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain FIGURES, wherein:

FIG. 1 is block diagram view of the frequency correcting system.

DETAILED DESCRIPTION

Reference will now be made to the drawings wherein like reference numerals identify similar structural features or aspects of the subject invention. For purposes of explanation and illustration, and not limitation, a partial view of an exemplary embodiment of a direct current generation system in accordance with the disclosure is shown in FIG. 1 and is designated generally by reference character 100. The methods and systems of the disclosure can be used to decrease the bus voltage ripple, which in turn improves system efficiencies.

FIG. 1 shows a variable frequency generator (VFG) 102 configured to direct alternating current to a first rectifier 104, which is configured to convert alternating current from a generator 110 to direct current and drive it to an HVDC Bus Network 106 responsible for distributing power to various aircraft components. A variable frequency second generator (VFG) 103 is shown including a second generator 111 configured to direct alternating current to a second rectifier 105 configured to convert alternating current from the second generator 111 and also direct it to the HVDC Bus Network 106. The HVDC Bus Network 106 includes a pair of independent DC busses 107/108 configured to distribute power to various parts of the aircraft.

Further shown in FIG. 1, a speed correcting gearbox 130 is operatively connected to the VFG configured to align generator frequency output to the second generator frequency output. A VFG control unit 112 is operatively connected to the generator 110 and to the electric module 106 configured to control the VFG 102 and a separate second generator control unit 113 is operatively connected to the second generator 111 and the HVDC Bus Network 106 configured to control the second generator. It is further conceived that speed correction can be located on high spool generator to align the frequency instead of the low spool.

The VFG 102 is operatively connected to a low-pressure spool gearbox 114 and the speed-correcting gearbox 110 is located between the VFG 102 and the low pressure gearbox 114. The second generator 111 is operatively connected to a high-pressure gearbox spool.

A method for controlling the system discussed above is also disclosed. The method includes driving alternating current from a first generator (VFG) connected to a low pressure gearbox spool resulting in a first frequency output, driving alternating current from a second generator connected to a high pressure gearbox spool resulting in a second frequency output and aligning the frequency output of the first generator to the frequency output of the second generator in order to control performance parameters of a direct current system of an aircraft. Aligning the frequencies is intended to reducing voltage ripple, and load ripple that is caused by misaligned frequency outputs.

The methods and systems of the present disclosure, as described above and shown in the drawings, provide for electrical control system with superior properties including increased reliability and stability, and. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A system comprising:
   a variable frequency generator (VFG) including a generator configured to conduct alternating current to a first rectifier configured to convert alternating current from the VFG to direct current and drive it to an HVDC Bus Network;
   a second variable frequency generator including a second generator configured to conduct alternating current to a second rectifier configured to convert alternating current from the second generator to direct current and direct it to the HVDC Bus Network;
   a speed correcting gearbox operatively connected to the VFG configured to align a generator frequency to a second generator frequency;
   a VFG control unit operatively connected to the generator configured to control the VFG input speed and regulation; and
   a second generator control unit operatively connected to the second generator and the HVDC Bus Network configured to control the second generator regulation;
   wherein the VFG is operatively connected to a low-pressure spool gearbox spool engine of an aircraft and the speed-correcting gearbox is located between the VFG and the low-pressure spool gearbox.

2. The system of claim 1, wherein the second generator is operatively connected to a high-pressure gearbox spool engine of the aircraft.

3. The system of claim 1, wherein the output of the first rectifier is 540 volts.

4. The system of claim 1, wherein the output of the second rectifier is 540 volts.

5. The system of claim 1, wherein the HVDC Bus Network includes a pair of independent DC busses configured to distribute power.

6. The system of claim 1, wherein the system is configured to control power transfer of an aircraft engine.

7. A method comprising:
   placing a speed-correcting gearbox between a first generator and a low-pressure gearbox;
   driving alternating current from the first generator connected to the low pressure gearbox spool;
   driving alternating current from a second generator connected to a high pressure gearbox spool; and
   aligning a frequency output of the first generator to a frequency output of the second generator in order to control performance parameters of a direct current system of an aircraft.

8. The method of claim 7, further comprising reducing voltage ripple.

9. The method of claim 7, further comprising reducing load ripple.

10. The method of claim 7, wherein the first generator (VFG) conducts 115/230 volts AC to a first rectifier which converts to 540 Vdc output.

11. The method of claim 7, wherein the second generator conducts 115/230 volts AC to a second rectifier which converts to 540 Vdc output.

* * * * *